(12) United States Patent
Burlatsky et al.

(10) Patent No.: US 11,731,214 B2
(45) Date of Patent: Aug. 22, 2023

(54) CONDITIONING PROCESS FOR ADDITIVE MANUFACTURING

(71) Applicant: United Technologies Corporation, Farmington, CT (US)

(72) Inventors: Sergei F. Burlatsky, West Hartford, CT (US); David Ulrich Furrer, Marlborough, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 831 days.

(21) Appl. No.: 16/427,891

(22) Filed: May 31, 2019

(65) Prior Publication Data

US 2020/0376550 A1    Dec. 3, 2020

(51) Int. Cl.

| | |
|---|---|
| *B33Y 30/00* | (2015.01) |
| *B22F 10/362* | (2021.01) |
| *B22F 10/28* | (2021.01) |
| *B33Y 10/00* | (2015.01) |
| *B23K 26/16* | (2006.01) |

(Continued)

(52) U.S. Cl.
CPC ............... *B33Y 30/00* (2014.12); *B22F 1/05* (2022.01); *B22F 10/28* (2021.01); *B22F 10/362* (2021.01); *B22F 10/366* (2021.01); *B23K 26/0869* (2013.01); *B22F 10/36* (2021.01); *B22F 12/13* (2021.01); *B22F 12/41* (2021.01); *B22F 12/45* (2021.01); *B22F 12/67* (2021.01); *B22F 2304/10* (2013.01); *B23K 26/16* (2013.01); *B33Y 10/00* (2014.12)

(58) Field of Classification Search
CPC ...... B22F 12/00; B22F 10/10; B22F 2304/10; B22F 1/05; B22F 10/366; B22F 10/28; B22F 10/362; B23K 26/0869; B23K 26/16; B23K 15/004; B23K 15/0086; B23K 2101/001; B23K 26/0676; B23K 26/342; B33Y 10/00; B33Y 30/00; B33Y 50/02; Y02P 10/25

See application file for complete search history.

(56) References Cited

U.S. PATENT DOCUMENTS

| | | |
|---|---|---|
| 2017/0173736 A1 | 6/2017 | Gray |
| 2017/0173737 A1 | 6/2017 | Gray |

(Continued)

*Primary Examiner* — Anthony M Liang
*Assistant Examiner* — Danny N Kang
(74) *Attorney, Agent, or Firm* — Bachman & LaPointe, P.C.

(57) ABSTRACT

A method of additively manufacturing includes determining a track for manufacturing a layer of a component with a powder blend; traversing the track with a conditioning energy beam to cause sintering of powder particles along a denuded region within the powder blend; and traversing the track with a melting energy beam subsequent to the conditioning energy beam to from the layer of the component. An additive manufacturing system includes a build chamber that contains a powder blend; a controller operable to determine a track for manufacturing a layer of a component with the powder blend in the build chamber; a conditioning energy beam directed along the track by the controller to cause sintering of powder particles along a denuded region within the powder blend; and a melting energy beam directed along the track by the controller subsequent to the conditioning energy beam to form the layer of the component.

10 Claims, 4 Drawing Sheets

(51) Int. Cl.
  *B23K 26/08*   (2014.01)
  *B22F 10/366*  (2021.01)
  *B22F 1/05*    (2022.01)
  B22F 12/13     (2021.01)
  B22F 12/41     (2021.01)
  B22F 12/45     (2021.01)
  B22F 12/67     (2021.01)
  B22F 10/36     (2021.01)

(56)  References Cited

U.S. PATENT DOCUMENTS

2017/0197278 A1\*  7/2017  Garry .................. B23K 26/064
2017/0304895 A1   10/2017  Porch et al.
2018/0079003 A1    3/2018  Lin et al.
2018/0311760 A1   11/2018  El Naga et al.
2019/0009369 A1\*  1/2019  Vorontsov .......... B23K 26/0608

\* cited by examiner

CONDITIONING PROCESS FOR ADDITIVE MANUFACTURING

BACKGROUND

The present disclosure relates to additive manufacturing and, more particularly, to a conditioning energy beam that precedes a melting energy beam along a track for additive manufacturing.

Additive manufacturing systems provide for the fabrication of complex metal, alloy, ceramic and composite structures by a layer-by-layer freeform construction of a workpiece. The principle behind additive manufacturing processes involves the selective melting of atomized precursor powder particles in powder beds by a directed energy source, producing a lithographic buildup of the workpiece. The melting of the powder occurs along a track in a small localized region of the energy beam, producing small volumes of melting, called melt pools, followed by rapid solidification, allowing for very precise control of the solidification process in the layer-by-layer fabrication of the workpiece. These devices are directed by three dimensional geometry solid models developed in computer aided design (CAD) software systems.

Additive manufacturing systems may be challenged by powder costs and powder size distribution control such that there is a desire to use a wide range of powder sizes in a powder blend for DLMS processing for economic reasons as it may be costly to sort particles by size. This size range may be an issue on the coarse size ranges, but also on the fine powder sizes. The use of fine powders that are not specifically removed from the powder feedstock can lead to isolated powder melt rate issues that can result in localized part defects.

When the energy beam impacts isolated powder particles the rate of heating for that particle is extremely high which superheats the isolated powder particle due to limited heat extraction from point contacts only. This can lead to rapid and near instantaneous vaporization of the fine metallic particle that produces a plume of fine metallic "smoke" during the laser scanning process. This "smoke" results in scattering and reduction in effective laser energy at the powder surface, which also can also result in control problems. Additionally, critical sized fine isolated powders can be superheated to produce local vaporization that thrusts the entire melted particle out of the powder bed to be exposed to further chamber atmosphere and potential oxidation. These particles re-land in the powder bed and may be melted in subsequent laser passes, but may introduce higher oxygen or other contaminant from its superheated flight.

Controlling the evolution of vapors and expelling of fine powders is a major challenge in current additive manufacturing capabilities.

SUMMARY

A method of additively manufacturing according to one disclosed non-limiting embodiment of the present disclosure includes determining a track for manufacturing a layer of a component from a multiple of powder particles of a powder blend; traversing the track with a conditioning energy beam to sinter isolated powder particles of the multiple of powder particles along a denuded region; and traversing the track with a melting energy beam subsequent to the conditioning energy beam to form the layer of the component.

A further embodiment of any of the foregoing embodiments of the present disclosure includes, wherein determining the track comprises forming a pattern in a discreet band.

A further embodiment of any of the foregoing embodiments of the present disclosure includes, wherein forming the pattern comprises forming a serpentine pattern.

A further embodiment of any of the foregoing embodiments of the present disclosure includes forming a conditioning spot along the track with the conditioning energy beam and forming a melt spot along the track with the melting energy beam, wherein the conditioning spot is larger than the melt spot.

A further embodiment of any of the foregoing embodiments of the present disclosure includes forming the conditioning spot from 150%-300% a size of the melt spot.

A further embodiment of any of the foregoing embodiments of the present disclosure includes operating the conditioning energy beam at a power of 0.1-0.3 a power of the melting energy beam.

A further embodiment of any of the foregoing embodiments of the present disclosure includes, wherein the powder blend contains powder particles that range from 3.9-74 microns for DMLS IN718 type materials.

A further embodiment of any of the foregoing embodiments of the present disclosure includes, wherein traversing the track with the conditioning energy beam comprises trimming powder particles below a predetermined size from the powder blend to increase contact between a powder particle below a predetermined size to at least one adjacent powder particle of a greater size.

A further embodiment of any of the foregoing embodiments of the present disclosure includes, wherein traversing the track with the conditioning energy beam comprises operating the conditioning energy beam at a power to increase contact between a portion of the multiple of powder particles less than 10-20 microns for DMLS IN718 type materials.

A further embodiment of any of the foregoing embodiments of the present disclosure includes operating the conditioning energy beam at a power to increase contact between the isolated powder particles without vaporization thereof.

An additive manufacturing system according to one disclosed non-limiting embodiment of the present disclosure includes a build chamber that contains a multiple of powder particles of a powder blend; a controller operable to determine a track for manufacturing a layer of a component with the powder blend in the build chamber; a conditioning energy beam directed along the track by the controller to sinter isolated powder particles of the multiple of powder particles along a denuded region; and a melting energy beam directed along the track by the controller subsequent to the conditioning energy beam to form the layer of the component.

A further embodiment of any of the foregoing embodiments of the present disclosure includes, wherein the track comprises a pattern in a discreet band.

A further embodiment of any of the foregoing embodiments of the present disclosure includes, wherein the pattern comprises a serpentine.

A further embodiment of any of the foregoing embodiments of the present disclosure includes, wherein the conditioning energy beam forms a conditioning spot larger than a melt pool formed by the melting energy beam.

A further embodiment of any of the foregoing embodiments of the present disclosure includes, wherein the conditioning energy beam trims powder particles below a predetermined size from the powder blend distribution by connecting a portion of the multiple of powder particles below a predetermined size to adjacent powder particles.

A further embodiment of any of the foregoing embodiments of the present disclosure includes, wherein the conditioning energy beam forms a spot from 150%-300% a diameter of the melt pool formed by the melting energy beam.

A further embodiment of any of the foregoing embodiments of the present disclosure includes, wherein the conditioning energy beam operates at a power of 0.1 of a power of the melting energy beam.

A further embodiment of any of the foregoing embodiments of the present disclosure includes, wherein the powder blend contains powder particles that range from 3.9-74 microns for DMLS IN718 type materials.

A further embodiment of any of the foregoing embodiments of the present disclosure includes, wherein the conditioning energy beam forms a spot that spans the denuded region.

A further embodiment of any of the foregoing embodiments of the present disclosure includes, wherein the conditioning energy beam is generated by a first source and the melting energy beam is generated by a second source.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The components in the drawings are not necessarily to scale. Moreover, in the drawings, like reference numerals designate corresponding parts throughout the several views. The drawings that accompany the detailed description can be briefly described as follows.

DETAILED DESCRIPTION

Figure 1:
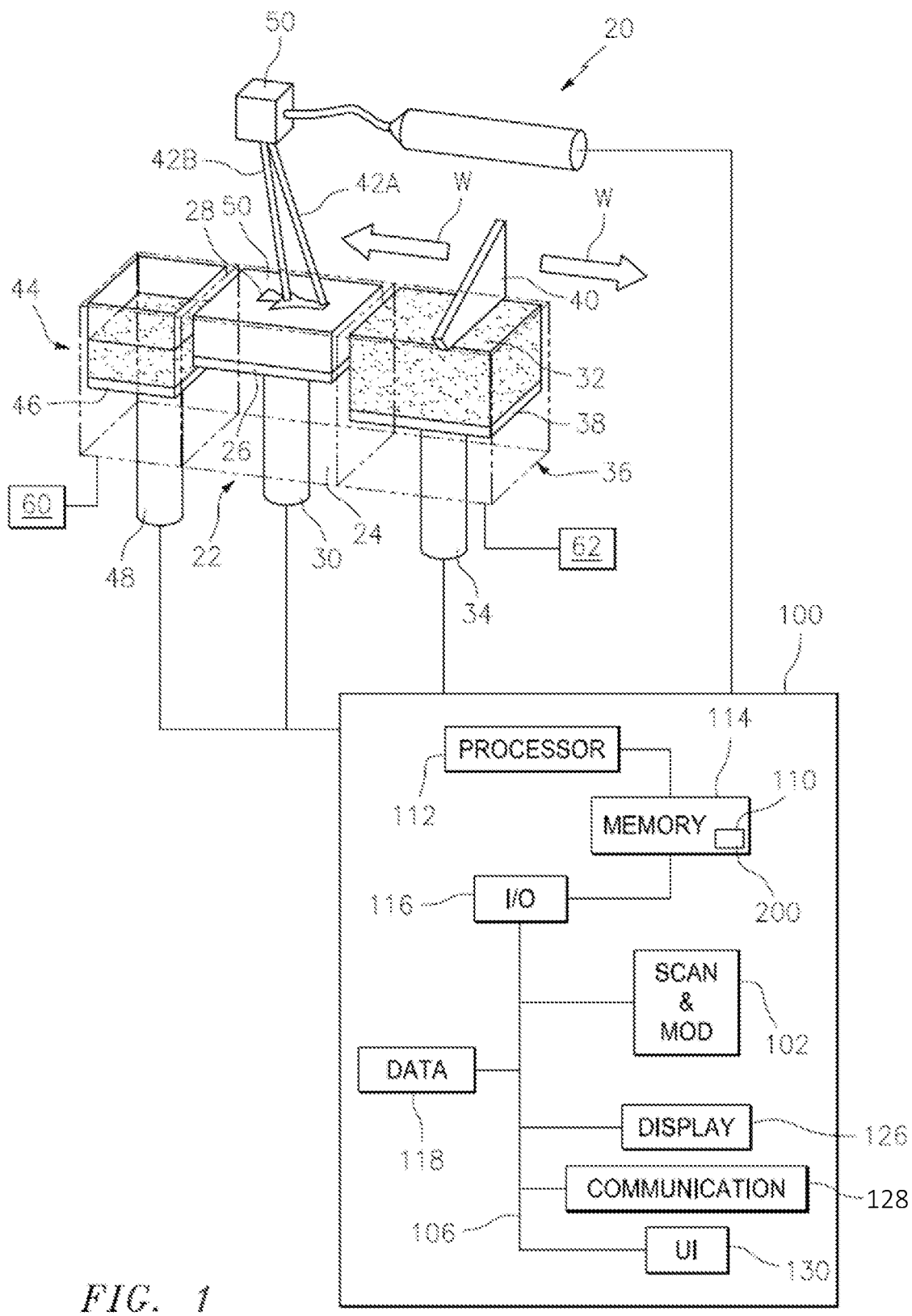
FIG. 1 is a schematic cross section of an additive manufacturing system.

FIG. 1 schematically illustrates an additive manufacturing system 20 that may have particular applicability to an additive manufacturing process for gas turbine engine components 28 such as turbine blades, vanes, combustor components, augmentor components, etc. Although a Direct Metal Laser Sintering (DMLS) additive manufacturing system 20 is schematically illustrated it should be appreciated that other additive layer manufacturing (ALM) devices, such as selective laser melting (SLM), laser beam melting (LBM) and electron beam melting (EBM) that provide for the fabrication of complex metal, alloy, ceramic and composite structures by a layer-by-layer freeform construction of a workpiece will also benefit herefrom.

The system 20 generally includes a chamber 22 that includes a process space 24 in which a build plate 26 upon which an additively manufactured component 28 is grown. This build plate 26 can be lowered by an actuator 30, so that the component 28 can be produced in a stock of powder 32 contained in the process space 24.

The stock of powder 32 originates from a powder dispenser 36 atop a dispenser plate 38 that can be raised by an actuator 34. The stock of powder 32 is typically a powder blend that contains powder particles that range from, for example, 3.9-74 microns for DMLS IN718 type materials. Each layer of the additively manufactured component 28 is grown in the stock of powder 32 on the build plate 26, then a recoater blade 40 sweeps across the surface thereof in a linear recoat direction as indicated by arrow W. The recoater blade 40 is moved over the stock of powder 32 in the dispenser 36, with the result that, after the lowering of the build plate 26, a further layer of powder is applied and leveled by the recoater blade 40 such that the next layer of the component 28 may be formed by an energy beam 42 from an energy source 50. In this embodiment, a conditioning energy beam 42A and a melting energy beam 42B may be emitted from a single or from multiple energy sources then are deflected and focused by moveable physical or electronic mirror systems. The recoater blade 40 spreads excess powder 32 from the process space 24 into a powder collector 44 atop a collector plate 46 that is correspondingly lowered by an actuator 48. The additively manufactured component 28 is grown on the build plate 26 and the recoater blade 40 sweeps across the surface thereof in a linear recoat direction as indicated by arrow W.

The conditioning energy beam 42A and the melting energy beam 42B may be laser beams, electron beams or any other energy beams capable of heating the powder to sufficient temperatures and at sufficient rates to perform the necessary function of forming a melt pool then, following solidification, a weld bead. For instance, energy beams with shorter wavelengths may heat up the powder particles faster than beams with longer wavelengths. Different optical frequencies or wavelengths typically require different types of laser; for example, $CO_2$ lasers, diode lasers, and fiber lasers. However, to preselect the wavelength (and thus laser type) for heating and/or melting, the wavelength selected can be based on the composition of the metal powder, for example. That is, particles of a powder can have different heat absorption rates, impacting melting rates and solidification rates. Moreover, and besides wavelength, other properties of the beam may be a factor. For instance, pulsed laser beams or continuous laser beams can be desired to melt the powder.

An inlet manifold 60 communicates an inert process gas such as argon or nitrogen through the process space 24 over the build plate 26 to an outlet manifold 62. This inert process gas may minimize undesirable reactions of the melting bath of component material with gaseous constituents to discharge possible evaporation products of the component material through the outlet manifold 62.

The control system 100 may include hardware, firmware, and/or software components that are configured to perform the functions disclosed herein, including the functions of a model driven scan subsystem 102. While not specifically shown, the control system 100 may include other computing devices (e.g., servers, mobile computing devices, etc.) and computer aided manufacturer (CAM) systems which may be in communication with each other and/or the control system 100 via a communication network 106 to perform one or more of the disclosed functions. The control system 100 may include at least one processor 112 (e.g., a controller, microprocessor, microcontroller, digital signal processor, etc.), memory 114, and an input/output (I/O) subsystem 116. The control system 100 may be embodied as any type of computing device e.g., a server, an enterprise computer system, a network of computers, a combination of computers and other electronic devices, or other electronic devices. Although not specifically shown, the I/O subsystem 116 typically includes, for example, an I/O controller, a memory controller, and one or more I/O ports. The processor 112 and the I/O subsystem 116 are communicatively coupled to the memory 114. The memory 114 may be embodied as any type of computer memory device (e.g., volatile memory such as various forms of random access memory).

The I/O subsystem 116 is communicatively coupled to a number of hardware, firmware, and/or software components, including a data storage device 118, a display 126, a communication subsystem 128, a user interface (UI) subsystem 130, the model driven scan subsystem 102, and the repair determination subsystem 104. The data storage device 118 may include one or more hard drives or other suitable persistent storage devices (e.g., flash memory, memory cards, memory sticks, and/or others).

The display 126 may be embodied as any type of digital display device, such as a liquid crystal display (LCD), and may include a touchscreen. The display 126 is configured or selected to be capable of displaying two- and/or three-dimensional graphics. The communication subsystem 128 may include one or more optical, wired, and/or wireless network interface subsystems, cards, adapters, or other devices, as may be needed pursuant to the specifications and/or design of the particular computing device. The user interface subsystem 130 may include one or more user input devices (e.g., the display 126, a microphone, a touchscreen, keyboard, virtual keypad, etc.) and one or more output devices (e.g., audio speakers, LEDs, additional displays, etc.) to facilitate manufacture of the component 28.

Figure 2:
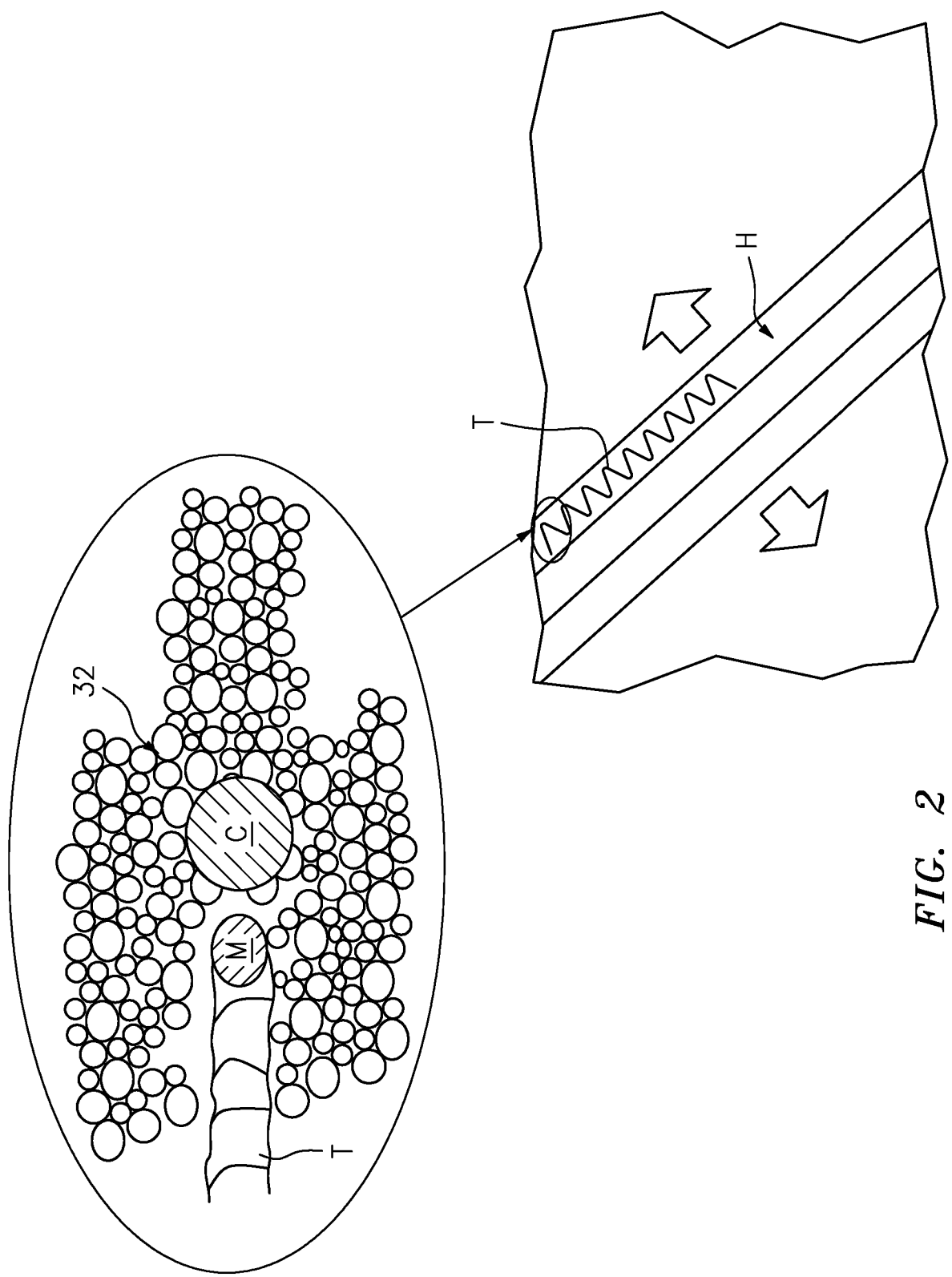
FIG. 2 is an expanded schematic view of an example track to fabricate an additively manufactured component.

With reference to FIG. 2, additive manufacturing is accomplished along a series of tracks T that are produced in a serpentine or similar regular pattern in a discreet band called a hatch H. When a powder layer is melted by the energy beam and a track T (also referred to as a "bead") is formed, the area next to the melted track T will be denuded D (FIG. 3) or voided of powder particles. As the area next to melted track T is denuded of powders, a low powder density region D1 is formed in the powder D2. The low powder density region D1 may include isolated powder particles. Subsequent tracks would heretofore direct the melting energy beam over the denuded and low density powder regions which may lead to isolated particle overheating and vaporization.

Figure 4:
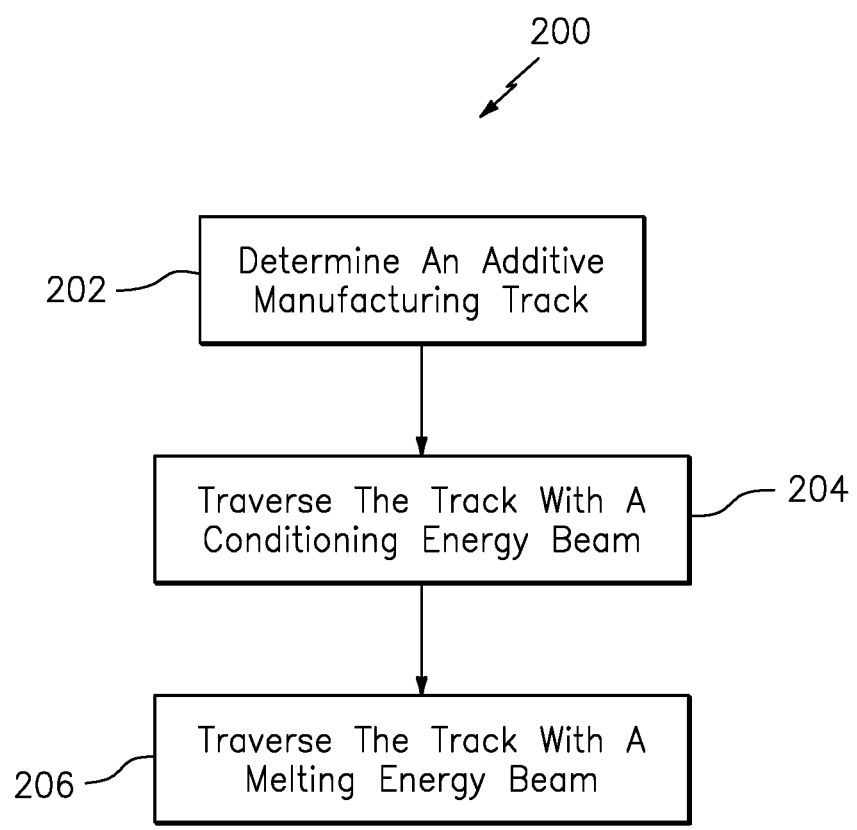
FIG. 4 is a block diagram representative of a method to condition a track for additive manufacturing.

With reference to FIG. 4, the control system 100 executes logic 110 (FIG. 1) representative of a method 200 to actively control the conditioning energy beam 42A that precedes the melting energy beam 42B. The functions of the method 200 are disclosed in terms of functional block diagrams, and it should be appreciated that these functions may be enacted in either dedicated hardware circuitry or programmed software routines capable of execution in a microprocessor-based electronics control embodiment.

Initially, the additive manufacturing is effectuated by the control system 100 that determines a track T (202) for manufacturing the layer of the component 28 from the multiple of powder particles of the powder blend. The track T defines the layer of the component over which traverses the conditioning energy beam 42A prior to the melting energy beam 42B. That is, the lower energy conditioning energy beam 42A precedes the melting energy beam 42B that is conventionally used for melting along the track T to form the layer.

Figure 3:
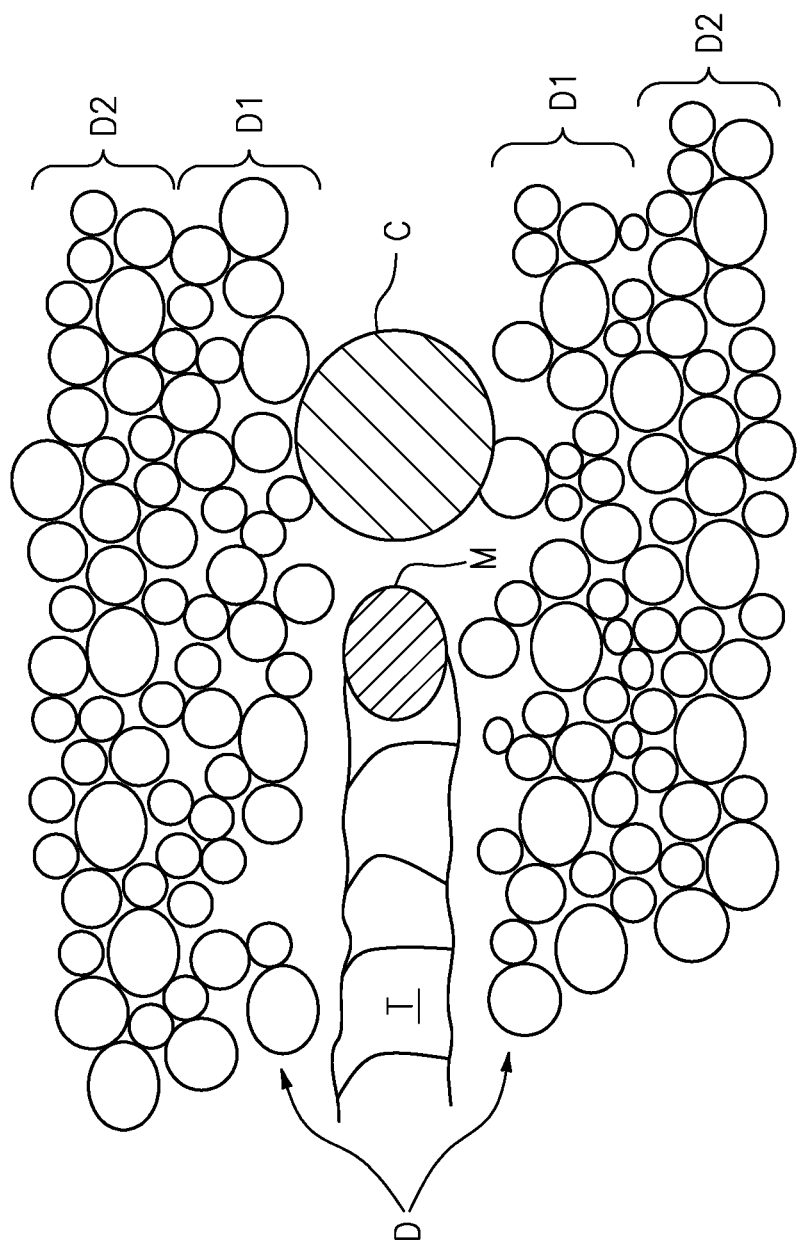
FIG. 3 is a schematic view of an example track to fabricate an additively manufactured component.

Next, the conditioning energy beam 42A traverses the track T (204) to cause sintering of isolated powder particles along the denuded region D (FIG. 3). The energy of the conditioning energy beam 42A is of a power level that melts the isolated powder particles (e.g., particles with limited heat sink capability) while not overheating these isolated powder particles to vaporization temperatures. The isolated powder particles are heated sufficiently by the conditioning energy beam 42A to melt these isolated powder particles to larger neighboring particles. These combined particles provide for sufficient mass and thermal conductivity to mitigate superheating to the point of local volume volatilization. This conditioning is essentially limited to sufficient energy to sinter isolated powder particles but not the entire track, which facilitates re-use of powder particles in the powder bed as only the relatively small or isolated powder particles are melted to the adjacent particles.

The power density in the conditioning energy beam 42A is lower than in melting energy beam 42B but the conditioning spot C size is larger by approximately the hatch distance so that conditioning spot covers isolated powder particles in a denuded region (FIG. 3). According to modeling results, the conditioning energy beam 42A operates at an order of magnitude smaller energy density than the melting energy beam 42B. The conditioning energy beam 42A in one example, operates at a power of 0.1-0.3 a power of the melting energy beam 42B and provides a conditioning spot that is 150%-300% a size of the melt spot from the melting energy beam 42B. In one embodiment, the conditioning spot spans the denuded region.

The use of the conditioning energy beam 42A along the track T forward of the melting energy beam 42B allows the relatively small and isolated powder particles to be heated to a point of increasing contact with surrounding material through either controlled melting and welding to adjacent powder particles or through solid-state sintering to adjacent material. Once the small or isolated powder particles are heated to have increased contact with adjacent powder particles, the previously isolated powder particles will perform as relatively larger particles with a higher packing density.

Next, the melting energy beam 42B traverses the track (206) subsequent to the conditioning energy beam 42A to form a melt pool then, following solidification, a weld bead of the layer of the component 28.

The conditioning consolidates fine particles and/or isolated particles that may occur within the denuded regions from a prior path. This conditioning of small and/or isolated particles prevents these particles from becoming superheated and producing metallic plumes or being ejected from the powder bed; both of which may be issues for quality control in additive manufacture. This conditioning effectively trims the smaller powders from the powder blend distribution by connecting the isolated powder particles to adjacent powder particles. This process effectively mitigates the issue of powder bed density (powder packing) variation so that a low density powder bed region will then function as a single, uniform, high density powder bed from an energy beam absorption and powder melting perspective.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed:

1. A method of additively manufacturing, comprising:
determining a track for manufacturing a layer of a component from a multiple of powder particles of a powder blend, the track including a denuded region that has reduced particle density and isolated powder particles due to a prior melting energy beam traversing a prior track adjacent to the track;
traversing the track with a conditioning energy beam to sinter the isolated powder particles of the multiple of powder particles along the denuded region; and
traversing the track with a melting energy beam subsequent to the conditioning energy beam to form the layer of the component, whereby the layer of the component is formed without overheating the isolated powder particles, and the melting energy beam generates an adjacent denuded region having isolated powder particles; and
repeating the traversing steps along a next track along the adjacent denuded region.

2. The method as recited in claim 1, wherein determining the track comprises forming a pattern in a discreet band.

3. The method as recited in claim 2, wherein forming the pattern comprises forming a serpentine pattern.

4. The method as recited in claim 1, further comprising forming a conditioning spot along the track with the conditioning energy beam and forming a melt spot along the track with the melting energy beam, wherein the conditioning spot is larger than the melt spot.

5. The method as recited in claim 4, further comprising forming the conditioning spot from 150%-300% a size of the melt spot.

6. The method as recited in claim 1, further comprising operating the conditioning energy beam at a power of 0.1-0.3 a power of the melting energy beam.

7. The method as recited in claim 1, wherein the powder blend contains powder particles that range from 3.9-74 microns for DMLS IN718 type materials.

8. The method as recited in claim 1, wherein traversing the track with the conditioning energy beam comprises trimming powder particles below a predetermined size from the powder blend to increase contact between a powder particle below a predetermined size to at least one adjacent powder particle of a greater size.

9. The method as recited in claim 1, wherein traversing the track with the conditioning energy beam comprises operating the conditioning energy beam at a power to increase contact between a portion of the multiple of powder particles less than 10-20 microns for DMLS IN718 type materials.

10. The method as recited in claim 1, further comprising operating the conditioning energy beam at a power to increase contact between the isolated powder particles without vaporization thereof.

* * * * *